(12) United States Patent
Suzuki (10) Patent No.: US 10,101,546 B2
(45) Date of Patent: Oct. 16, 2018

(54) OPTICAL MODULE AND METHOD FOR MANUFACTURING THE OPTICAL MODULE

(71) Applicant: Oclaro Japan, Inc., Sagamihara, Kanagawa (JP)

(72) Inventor: Takanori Suzuki, Tokyo (JP)

(73) Assignee: OCLARO JAPAN, INC., Kanagawa (JP)

( * ) Notice: Subject to any disclaimer, the term of this patent is extended or adjusted under 35 U.S.C. 154(b) by 0 days.

(21) Appl. No.: 15/351,479

(22) Filed: Nov. 15, 2016

(65) Prior Publication Data

US 2017/0139159 A1    May 18, 2017

(30) Foreign Application Priority Data

Nov. 18, 2015    (JP) .................................. 2015-225718

(51) Int. Cl.
*G02B 6/26* (2006.01)
*G02B 6/42* (2006.01)
(Continued)

(52) U.S. Cl.
CPC ............. *G02B 6/4206* (2013.01); *G02B 6/32* (2013.01); *G02B 6/4214* (2013.01);
(Continued)

(58) Field of Classification Search
CPC ...... G02B 6/32; G02B 6/4214; G02B 6/4206; G02B 6/4246; G02B 6/262; G02B 6/4212;
(Continued)

(56) References Cited

U.S. PATENT DOCUMENTS 5,872,880 A    2/1999    Maynard
6,450,702 B1    9/2002    Komoriya et al.
(Continued)

FOREIGN PATENT DOCUMENTS

JP    59-111616 A    6/1984
JP    2005-227553 A    8/2005
(Continued)

OTHER PUBLICATIONS

Non-Final Office Action received in corresponding U.S. Appl. No. 15/290,327 dated Nov. 15, 2016.
(Continued)

*Primary Examiner* — Kaveh C Kianni
*Assistant Examiner* — Hung Lam
(74) *Attorney, Agent, or Firm* — Mattingly & Malur, PC (57) ABSTRACT

An optical module includes: a photonic device emitting or receiving a light wave; an optical waveguide for transmitting the light wave; a lens focusing the light wave; a mirror for changing a traveling direction of the light wave to optically couple the photonic device with the optical waveguide; a manipulation lever for manipulating an orientation of the mirror; a support spring for supporting the mirror; and a substrate integrated with the mirror, the manipulation lever, and the support spring. The support spring couples the mirror with the substrate so as to allow the mirror to change the orientation thereof with movement or rotation along at least two axes. The manipulation lever extends from the mirror in a direction in which the manipulation lever avoids approaching the optical waveguide.

16 Claims, 8 Drawing Sheets

(51) Int. Cl.
*G02B 6/32* (2006.01)
*G02B 26/08* (2006.01)

(52) U.S. Cl.
CPC ......... *G02B 6/4244* (2013.01); *G02B 6/4249* (2013.01); *G02B 26/0816* (2013.01)

(58) Field of Classification Search
CPC  G02B 6/4249; G02B 6/4244; G02B 26/0816; G02B 26/0833; G02B 6/266
USPC ...................... 385/18, 25, 33, 39, 47, 57, 88
See application file for complete search history.

(56) References Cited

U.S. PATENT DOCUMENTS

| | | | |
|---|---|---|---|
| 7,009,747 | B2 | 3/2006 | Hara et al. |
| 7,136,554 | B1 | 11/2006 | Stevens |
| 9,523,825 | B2 * | 12/2016 | Okumura ............. G02B 6/4226 |
| 2003/0026582 | A1 * | 2/2003 | In'T Hout ............. G02B 6/266 |
| | | | 385/140 |
| 2004/0114942 | A1 | 6/2004 | Yee et al. |
| 2011/0013869 | A1 * | 1/2011 | Pezeshki ................. G02B 6/32 |
| | | | 385/33 |
| 2013/0258505 | A1 | 10/2013 | Yasui et al. |
| 2014/0233901 | A1 | 8/2014 | Hatori et al. |
| 2015/0078707 | A1 | 3/2015 | Pezeshki et al. |

FOREIGN PATENT DOCUMENTS

| | | |
|---|---|---|
| JP | 2012-517028 A | 7/2012 |
| JP | 2013-231937 A | 11/2013 |
| JP | 2014-157211 A | 8/2014 |
| WO | 2010/088631 A2 | 8/2010 |

OTHER PUBLICATIONS

Japanese Office Action received in corresponding Japanese Application No. 2014-251110 dated May 8, 2018 and partial translation thereof.

* cited by examiner

OPTICAL MODULE AND METHOD FOR MANUFACTURING THE OPTICAL MODULE

CROSS-REFERENCE TO RELATED APPLICATION

The present application claims priority from Japanese application JP 2015-225718, filed on Nov. 18, 2015, the content of which is hereby incorporated by reference into this application.

BACKGROUND OF THE INVENTION

1. Field of the Invention

The present invention relates to an optical module and a method for manufacturing the optical module.

2. Description of the Related Art

For improving the transmission speed and transmission capacity of optical communications, techniques for transmitting a plurality of optical signals in parallel have been studied. An optical module that performs parallel transmission may include optical axis adjustment mechanisms that individually adjust the optical axes of the optical signals.

JP 2013-231937 A discloses a method for manufacturing an optical device including the step of plastically deforming a first member and a second member by irradiation with laser light to thereby adjust the position of an optical element.

JP 2012-517028 T discloses an optical assembly including a movable lever that holds a lens focusing the light of a first waveguide into a second waveguide.

U.S. Patent Application Publication No. 2015/0078707 discloses a device including an adjustment mechanism with a micro-electro-mechanical-system (MEMS) lever including flexures and provided with a lens.

SUMMARY OF THE INVENTION

The optical module including the optical axis adjustment mechanisms individually adjusting the optical axes of the plurality of optical signals may increase in size according to an increase in the number of channels of the optical signals to be transmitted. In this case, when the optical axis adjustment mechanism is downsized for downsizing the module, the adjustable range may be limited, or advanced control may be needed for manipulating a micro mechanism.

Therefore, it is an object of the invention to provide an optical module capable of being downsized while favorably retaining the adjustable range and operability of an optical axis adjustment mechanism, and a method for manufacturing the optical module.

(1) For solving the above problem, an optical module according to an aspect of the invention includes: a photonic device emitting or receiving a light wave; an optical waveguide for transmitting the light wave; a lens focusing the light wave; a mirror for changing a traveling direction of the light wave to optically couple the photonic device with the optical waveguide; a manipulation lever for manipulating an orientation of the mirror; a support spring for supporting the mirror; and a substrate integrated with the mirror, the manipulation lever, and the support spring, wherein the mirror includes a mirror surface reflecting the light wave, the mirror surface being directed obliquely upward so that a first optical path between the mirror surface and the optical waveguide does not overlap a second optical path between the mirror surface and the photonic device, the support spring couples the mirror with the substrate so as to allow the mirror to change the orientation thereof with movement or rotation along at least two axes, and the manipulation lever extends from the mirror in a direction in which the manipulation lever avoids approaching the optical waveguide.

(2) The optical module according to (1), wherein the support spring extends in a direction different from the manipulation lever.

(3) The optical module according to (2), wherein a plurality of the support springs are provided to extend in directions different from each other.

(4) The optical module according to (1), wherein the manipulation lever is bent to connect to the mirror, and extends along the support spring.

(5) The optical module according to (1), wherein the manipulation lever is brazed to the substrate.

(6) The optical module according to (5), further including an electrode provided adjacent to the manipulation lever on the substrate and causing a brazing material to melt.

(7) The optical module according to (1), wherein the substrate is an SOI substrate, and the mirror, the manipulation lever, and the support spring are integrally formed in a surface Si layer of the SOI substrate.

(8) The optical module according to (1), wherein the lens is formed integrally with the photonic device.

(9) The optical module according to (1), wherein the photonic device is an array photonic device, which emits or receives each of a plurality of light waves, and the optical waveguide transmits each of the plurality of light waves.

(10) The optical module according to (1), further including an optical isolator between the mirror and the optical waveguide.

(11) The optical module according to (1), wherein the photonic device is a semiconductor laser device.

(12) The optical module according to (1), wherein the photonic device is a semiconductor light-receiving device.

(13) For solving the above problem, a method for manufacturing an optical module according to another aspect of the invention includes: a step of providing, to a substrate, a photonic device emitting or receiving a light wave, an optical waveguide for transmitting the light wave, and a lens focusing the light wave; a step of integrally forming, in the substrate, a mirror changing a traveling direction of the light wave to optically couple the photonic device with the optical waveguide, the mirror including a mirror surface reflecting the light wave, the mirror surface being directed obliquely upward so that a first optical path between the mirror surface and the optical waveguide does not overlap a second optical path between the mirror surface and the photonic device, a manipulation lever manipulating an orientation of the mirror and extending from the mirror in a direction in which the manipulation lever avoids approaching the optical waveguide, and a support spring supporting the mirror and coupling the mirror with the substrate so as to allow the mirror to change the orientation thereof with movement or rotation along at least two axes; and an adjustment step of manipulating the orientation of the mirror with the manipulation lever to adjust the traveling direction of the light wave reflected by the mirror.

(14) The method for manufacturing the optical module according to (13), further including, after the adjustment by the adjustment step, a brazing step of flowing a brazing material between the manipulation lever and the substrate and brazing the manipulation lever to the substrate.

(15) The method for manufacturing the optical module according to (13), wherein in the adjustment step, the orientation of the mirror is manipulated by applying an external force to a handle of the manipulation lever located on the side opposite to the optical waveguide with respect to a position where the mirror is disposed.

According to the invention, the optical module capable of being downsized while favorably retaining the adjustable range and operability of an optical axis adjustment mechanism, and the method for manufacturing the optical module are provided.

DETAILED DESCRIPTION OF THE INVENTION

Hereinafter, embodiments of the invention will be specifically described in detail based on the drawings. Throughout the drawings for illustrating the embodiments, members having the same function are denoted by the same reference numeral and sign, and the repetitive description thereof is omitted. The drawings shown below are merely illustrative of examples of the embodiments, and the size of the drawing does not necessarily coincide with the scale described in the examples.

Figure 1:
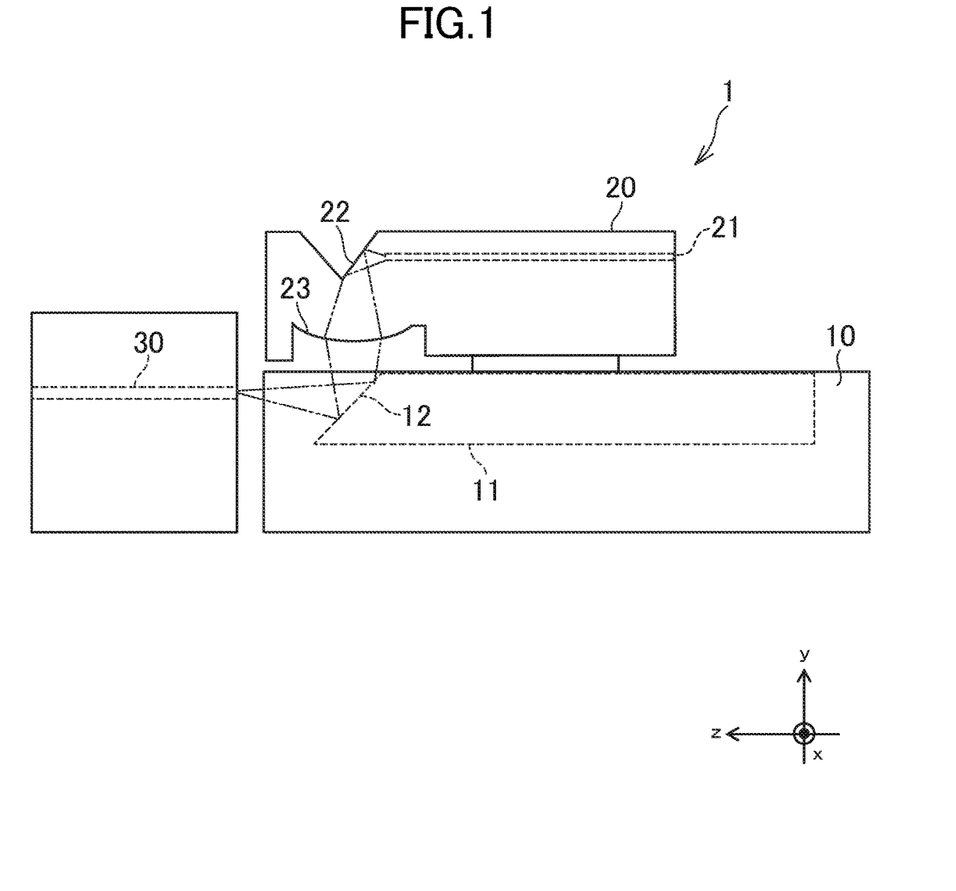
FIG. 1 is a side view showing an optical module according to an embodiment of the invention.
Figure 2:
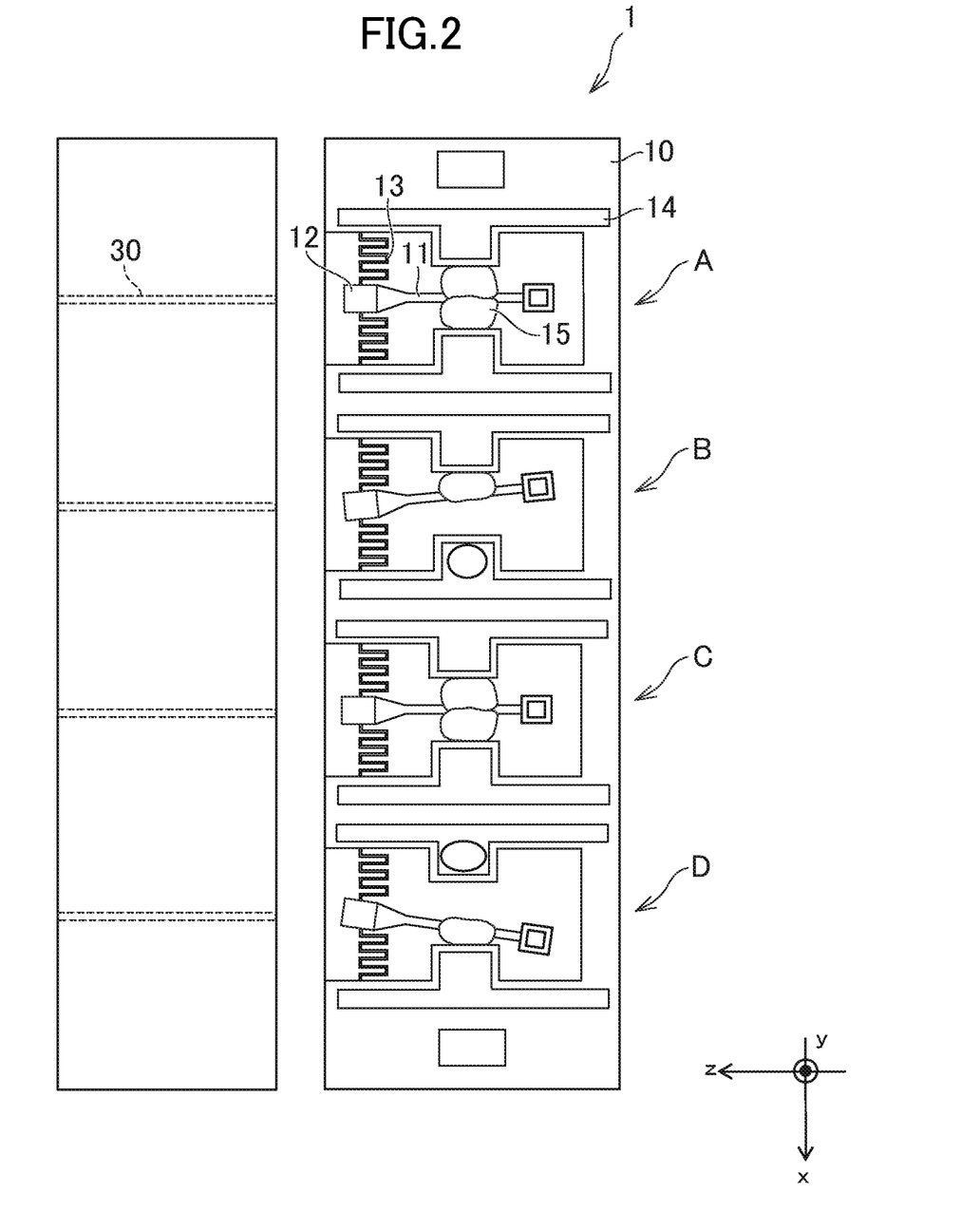
FIG. 2 is a top view showing the optical module according to the embodiment of the invention.

FIG. 1 is a side view showing an optical module 1 according to an embodiment of the invention. FIG. 1 represents the y-z plane, and the x-axis is an axis that penetrates the paper surface and is directed toward the front side. FIG. 2 is a top view showing the optical module 1 according to the embodiment of the invention. FIG. 2 represents the x-z plane, and the y-axis is an axis that penetrates the paper surface and is directed toward the front side. In FIG. 2, an array-type semiconductor laser device 20 is not illustrated for clarity of description. The optical module 1 according to the embodiment includes a first optical axis adjustment mechanism A, a second optical axis adjustment mechanism B, a third optical axis adjustment mechanism C, and a fourth optical axis adjustment mechanism D as optical axis adjustment mechanisms each including a mirror 12, a manipulation lever 11, and support springs 13. In the optical module 1 according to the embodiment, the array pitch (pitch in the x-axis direction between laser light incident on the first optical axis adjustment mechanism A and laser light incident on the second optical axis adjustment mechanism B) is 250 µm.

The optical module 1 includes the array-type semiconductor laser device 20 as a photonic device, a silicon-on-insulator (SOI) substrate 10, and optical waveguides 30. The array-type semiconductor laser device 20 is a photonic device that emits (sends) a plurality of light waves, and is specifically an array photonic device that oscillates four laser lights. The array-type semiconductor laser device 20 includes optical resonators 21 that oscillate the laser lights, mirror surfaces 22 that reflect the laser lights downward, and lenses 23 that focus the laser lights. The lens 23 is a lens that focuses the light wave, and formed integrally with the array-type semiconductor laser device 20. Since the lens 23 is formed integrally with the array-type semiconductor laser device 20, the optical module 1 is further downsized.

The SOI substrate 10 is a substrate including an insulating layer ($SiO_2$ layer) and a surface Si layer successively stacked on a Si substrate. The SOI substrate 10 according to the embodiment is integrated with the mirror 12, the manipulation lever 11, and the support springs 13. The mirror 12 changes the traveling direction of the light wave to optically couple the array-type semiconductor laser device 20 with the optical waveguide 30. The manipulation lever 11 is a lever that is provided to extend in the z-axis direction to manipulate the orientation of the mirror 12. The support springs 13 support the mirror 12. The mirror 12, the manipulation lever 11, and the support springs 13 are formed in a suspended state inside the SOI substrate 10, and the support springs 13 support the whole of them. The support springs 13 are provided to extend in the x-axis direction, and are not shown in FIG. 1.

The laser light reflected by the mirror 12 is incident on the optical waveguide 30. The optical waveguide 30 transmits the light wave. In the optical module 1 according to the embodiment, the photonic device is an array photonic device, which sends each of the plurality of light waves. Moreover, the optical waveguides 30 transmit the plurality of light waves. The photonic device and the optical waveguides 30 are formed into array forms, so that the optical module 1 can be downsized.

As shown in FIG. 1, the mirror 12 includes a mirror surface that reflects the light wave. The mirror surface is directed obliquely upward so that a first optical path between the mirror surface and the optical waveguide 30 does not overlap a second optical path between the mirror surface and the array-type semiconductor laser device 20. With this configuration, the laser light that is emitted from the array-type semiconductor laser device 20 in the negative direction with respect to the y-axis is reflected in the positive direction with respect to the z-axis and incident on the optical waveguide 30. It is easy to downsize the mirror 12. Therefore, by providing the mirror 12 at the tip of the manipulation lever 11, the optical axis adjustment mechanism can be downsized compared with the case where another optical component such as a ball lens is provided on the manipulation lever 11, and thus the optical module 1 can be downsized. Moreover, the distance between the mirror 12 and the optical waveguide 30 can be shortened, and thus the optical module 1 can be downsized. The mirror surface of the mirror 12 according to the embodiment is a plane whose normal direction falls in the y-z plane; however, the mirror surface maybe a curved surface or a plane whose normal direction is out of the y-z plane.

The support springs 13 couple the mirror 12 with the SOI substrate 10 so as to allow the mirror 12 to change the orientation thereof with movement or rotation along at least two axes. Specifically, the support springs 13 are provided so that the mirror 12 can move along the x-axis, the y-axis, and the z-axis. Moreover, the support springs 13 are provided so that the mirror 12 can rotate about the x-axis, the y-axis, and the z-axis. Since the mirror 12 can change the orientation thereof with movement or rotation along at least two axes as described above, the optical axis can be adjusted so that the laser light is coupled to the optical waveguide 30. Moreover, since the optical axis adjustment mechanisms are independently provided for each of the laser lights, optical coupling can be optimized for all of the optical waveguides 30. The support spring 13 according to the embodiment is elastically deformable, but may be plastically deformable. Moreover, by adjusting the number of steps or the width of the support spring 13, the magnitude of an external force necessary for displacing the mirror 12 and the force for holding the mirror 12 can be appropriately adjusted.

The manipulation lever 11 extends from the mirror 12 in a direction in which the manipulation lever 11 avoids approaching the optical waveguide 30. Specifically, the manipulation lever 11 extends in the negative direction with respect to the z-axis. In other words, the manipulation lever 11 extends in the same direction as the extending direction of the optical waveguide 30. Since the manipulation lever 11 extends in the direction in which the manipulation lever 11 avoids approaching the optical waveguide 30, the movable range of the manipulation lever 11 is widely ensured, and the manipulation lever 11 can be manipulated at a position not interfering with the array-type semiconductor laser device 20 or the like. Therefore, the adjustable range and operability of the optical axis adjustment mechanism become favorable.

In the optical module 1 according to the embodiment, the manipulation lever 11 is brazed to the SOI substrate 10 with a brazing material 15. The manipulation lever 11 included in the second optical axis adjustment mechanism B is brazed to the SOI substrate 10 in the state where the manipulation lever 11 is displaced in the negative direction with respect to the x-axis. The manipulation lever 11 included in the fourth optical axis adjustment mechanism D is brazed to the SOI substrate 10 in the state where the manipulation lever 11 is displaced in the positive direction with respect to the x-axis. By brazing the manipulation lever 11 in the state of being displaced as described above, the optical module 1 can be shipped in the state where the optical coupling with the optical waveguide 30 is reliably obtained. Wettability may be improved by depositing a metal film of gold or the like on a portion of the manipulation lever 11 to be brazed to the SOI substrate 10.

The optical module 1 according to the embodiment further includes electrodes 14 that are provided adjacent to the manipulation lever 11 on the SOI substrate 10 and cause the brazing material to melt. The electrode 14 generates heat due to an electric current flowing therethrough in response to an applied voltage, and causes the brazing material 15 to melt. In the example shown in FIG. 2, the brazing material 15 is left unmelted on the electrode 14 in the second optical axis adjustment mechanism B and the fourth optical axis adjustment mechanism D. When the manipulation lever 11 is displaced and brazed to the SOI substrate 10, brazing may be sufficiently performed only with the brazing material 15 on one side as in the second optical axis adjustment mechanism B or the fourth optical axis adjustment mechanism D, and thus the brazing material 15 not used for fixation may be left on the electrode 14. Since the brazing material 15 is melted using the electrode 14 as described above, the step of flowing the brazing material into a micro area can be easily carried out, and thus the fixation of the manipulation lever 11 is relatively easily performed. In the optical module 1 according to the embodiment, the brazing material 15 is previously prepared on all of the electrodes 14. However, the brazing material 15 may be placed on the electrode 14 when the manipulation lever 11 is brazed. In that case, the manipulation lever 11 is displaced to a desired position, the brazing material 15 is set on the electrode 14, an electric current is caused to flow through the electrode 14 to melt the brazing material 15, and the manipulation lever 11 is brazed. The manipulation lever 11 may be fixed with a UV curable resin or adhesive.

In the optical module 1 according to the embodiment, the mirror 12, the manipulation lever 11, and the support springs 13 are integrally formed in the surface Si layer of the SOI substrate 10. The mirror 12, the manipulation lever 11, and the support springs 13 are formed by etching the surface Si layer and the insulating layer of the SOI substrate 10 to form an external shape, and then dissolving only the insulating layer by etching. With the step described above, the mirror 12, the manipulation lever 11, and the support springs 13 in a suspended state are obtained. By integrally forming the mirror 12, the manipulation lever 11, and the support springs 13 in the surface Si layer of the SOI substrate 10, an optical axis adjustment mechanism that is very small and has a wide movable range can be obtained, and thus the optical module 1, which has a wide optical axis adjustment range and is downsized, is obtained.

The array-type semiconductor laser device 20 according to the embodiment is of a type in which a laser including the optical resonator 21 in a direction parallel to the SOI substrate 10 includes the mirror surface 22 allowing oscillation light to be emitted in a direction vertical to the SOI substrate 10, but is not limited to this type. For example, the so-called vertical cavity surface emitting laser (VCSEL), which includes an optical resonator in the direction vertical to the SOI substrate 10 and emits oscillation light in the direction vertical to the SOI substrate 10, maybe used. Further, an edge-emitting laser, which includes an optical resonator in the direction parallel to the SOI substrate 10 and emits oscillation light in the direction parallel to the SOI substrate 10, may be used. When the edge-emitting laser is used, it is preferable to employ the arrangement in which, for example, the edge-emitting laser is disposed with its emitting face side facing the SOI substrate 10 and a condensing lens is separately disposed between the emitting face and the mirror 12. Moreover, the array-type semiconductor laser device 20 according to the embodiment oscillates laser light at a wavelength of approximately 1310 nm, but the wavelength of laser light may be within the 1.3 μm band or 1.55 μm band, which is generally used in optical communications.

The mirror surface of the mirror 12 may be a 45° surface or surfaces, other than the 45° surface, which are obtained by subjecting the SOI substrate 10 to anisotropic wet etching. In the case of silicon, a crystal plane inclined at an angle of approximately 54° can be formed by wet etching using potassium hydroxide. In that case, when, for example, the emitted light is tilted from the y-axis to the edge face side of the optical resonator 21 by approximately 18°, the optical axis of light reflected by the mirror surface of the mirror 12 can be made substantially parallel to the SOI substrate 10.

Figure 3:
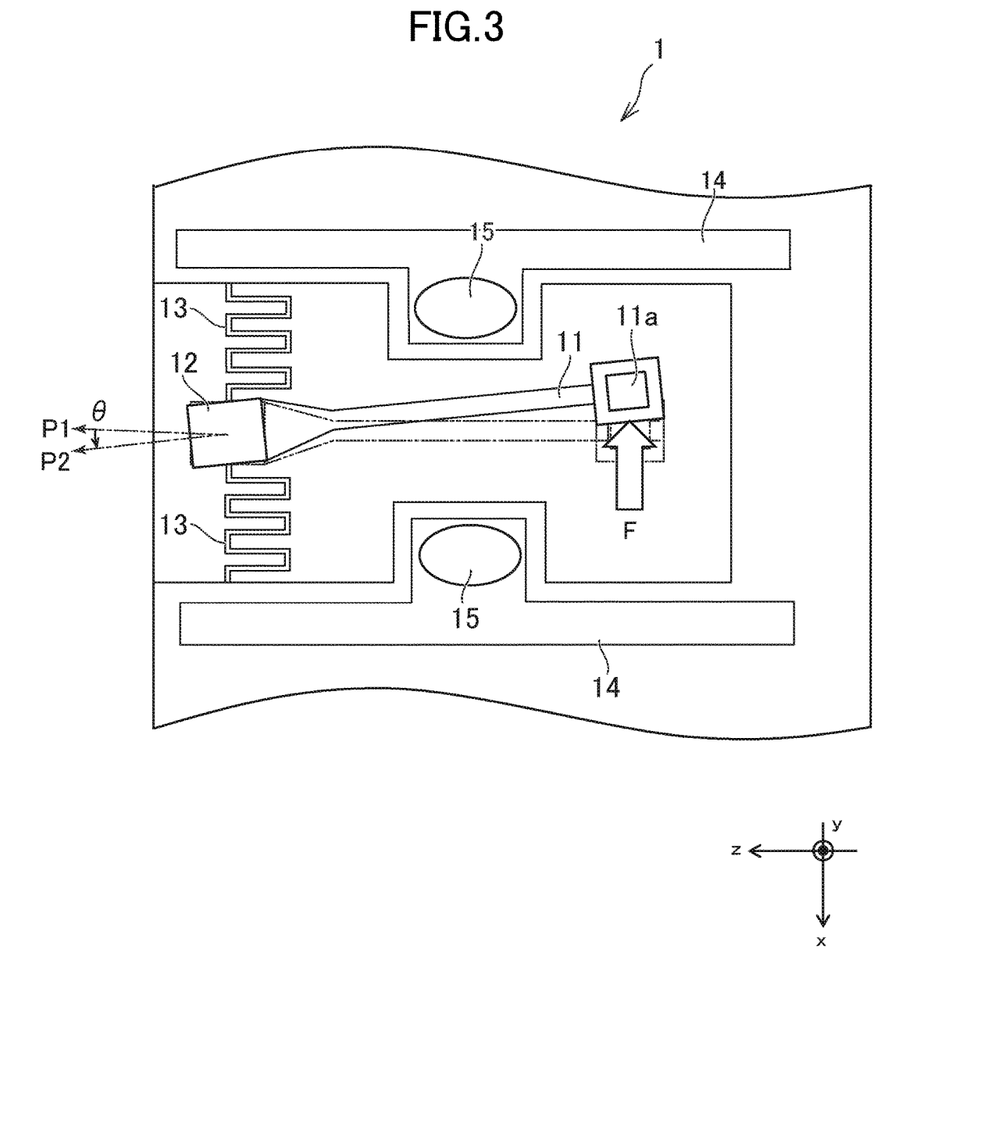
FIG. 3 is a top view showing an adjustment step in a method for manufacturing the optical module according to the embodiment of the invention.

FIG. 3 is a top view showing an adjustment step in a method for manufacturing the optical module 1 according to the embodiment of the invention. In the method for manufacturing the optical module 1 according to the embodiment, the step of integrally forming the mirror 12, the manipulation lever 11, and the support springs 13 in the SOI substrate 10 is first performed. Moreover, separately from the step described above, the step of preparing the photonic device (the array-type semiconductor laser device 20) sending or receiving light waves, and the optical waveguides 30 for transmitting the light waves is performed. The lens 23 condensing the light wave is integrated and formed into the array-type semiconductor laser device 20. However, the lens 23 is not limited to this and may be prepared as another member. Next, these components are assembled into the form shown in FIGS. 1 and 2. In this case, the mirror 12 changes the traveling direction of the light wave to optically couple the array-type semiconductor laser device 20 with the optical waveguide 30, and includes the mirror surface reflecting the light wave. The mirror surface is directed obliquely upward so that the first optical path between the mirror surface and the optical waveguide 30 does not overlap the second optical path between the mirror surface and the array-type semiconductor laser device 20. The manipulation lever 11 manipulates the orientation of the mirror 12, and extends from the mirror 12 in the direction in which the manipulation lever 11 avoids approaching the optical waveguide 30. The support springs 13 support the mirror 12, and couple the mirror 12 with the SOI substrate 10 so as to allow the mirror 12 to change the orientation thereof with movement or rotation along at least two axes.

Next, the adjustment step is performed. The adjustment step is the step of manipulating the orientation of the mirror 12 with the manipulation lever 11 to adjust the traveling direction of the light wave reflected by the mirror 12. In the example shown in FIG. 3, the orientation of the optical axis is rotated about the y-axis by an angle θ, and is changed from a first direction P1 to a second direction P2. Even when the array-type semiconductor laser device 20 or the optical waveguide 30 has an error in attachment position in the previous step, an optical signal is optically coupled reliably to the optical waveguide 30 by the adjustment step. Therefore, the optical module 1 capable of transmitting the optical signal with reduced loss is obtained.

In the adjustment step, the orientation of the mirror 12 is manipulated by applying an external force F to a handle 11a of the manipulation lever 11 located on the side opposite to the optical waveguide 30 with respect to the position where the mirror 12 is disposed. The handle 11a may be grasped by a manipulator or maybe provided with a hook. The external force applied to the handle 11a may be a contact force directly applied by the manipulator. However, the external force applied to the handle 11a may be a distant force such as an electrostatic force.

Further, the method for manufacturing the optical module 1 according to the embodiment includes, after the adjustment by the adjustment step, a brazing step of flowing the brazing material 15 between the manipulation lever 11 and the SOI substrate 10, and brazing the manipulation lever 11 to the SOI substrate 10. The brazing material 15 is melted by heating with an electric current flowing through the electrode 14, and is caused to flow between the manipulation lever 11 and the SOI substrate 10. With this configuration, the manipulation lever 11 is fixed in the state where the optical coupling is ensured, and thus the optical module 1 in which each laser light oscillated from the array device is optically coupled reliably to the optical waveguide 30 is obtained.

In the optical module 1 according to the embodiment, the support spring 13 extends in the direction different from the manipulation lever 11. That is, the manipulation lever 11 extends in the z-axis direction, while the support spring 13 extends in the x-axis direction. Moreover, two support springs 13 are provided in the opposite directions so as to support the mirror 12. Since the support spring 13 extends in the direction different from the manipulation lever 11, the direction in which the support spring 13 easily stretches or compresses (the x-axis direction in the example of FIG. 3) is orthogonal to the extending direction of the manipulation lever 11, and thus the movable range of the mirror 12 is widened. Moreover, since the two support springs 13 are provided in the opposite directions so as to support the mirror 12, the twisting of the mirror 12 is inhibited when the manipulation lever 11 is manipulated, and thus the orientation of the mirror 12 becomes stable.

In the optical module 1 according to the embodiment, the fulcrum of the support spring 13 is not provided between the mirror 12 and the optical waveguide 30 but is provided away from the mirror 12 in the direction in which the support spring 13 does not approach the optical waveguide 30. With this configuration, the distance between the mirror 12 and the optical waveguide 30 can be reduced, and thus the optical module 1 can be downsized. Although the support spring 13 is referred to as "spring" in the embodiment, this only expresses the function thereof. The support spring 13 does not need to have the so-called spring shape as long as the support spring 13 can elastically operate the mirror 12, and may be some kind of an elastic body.

Figure 4:
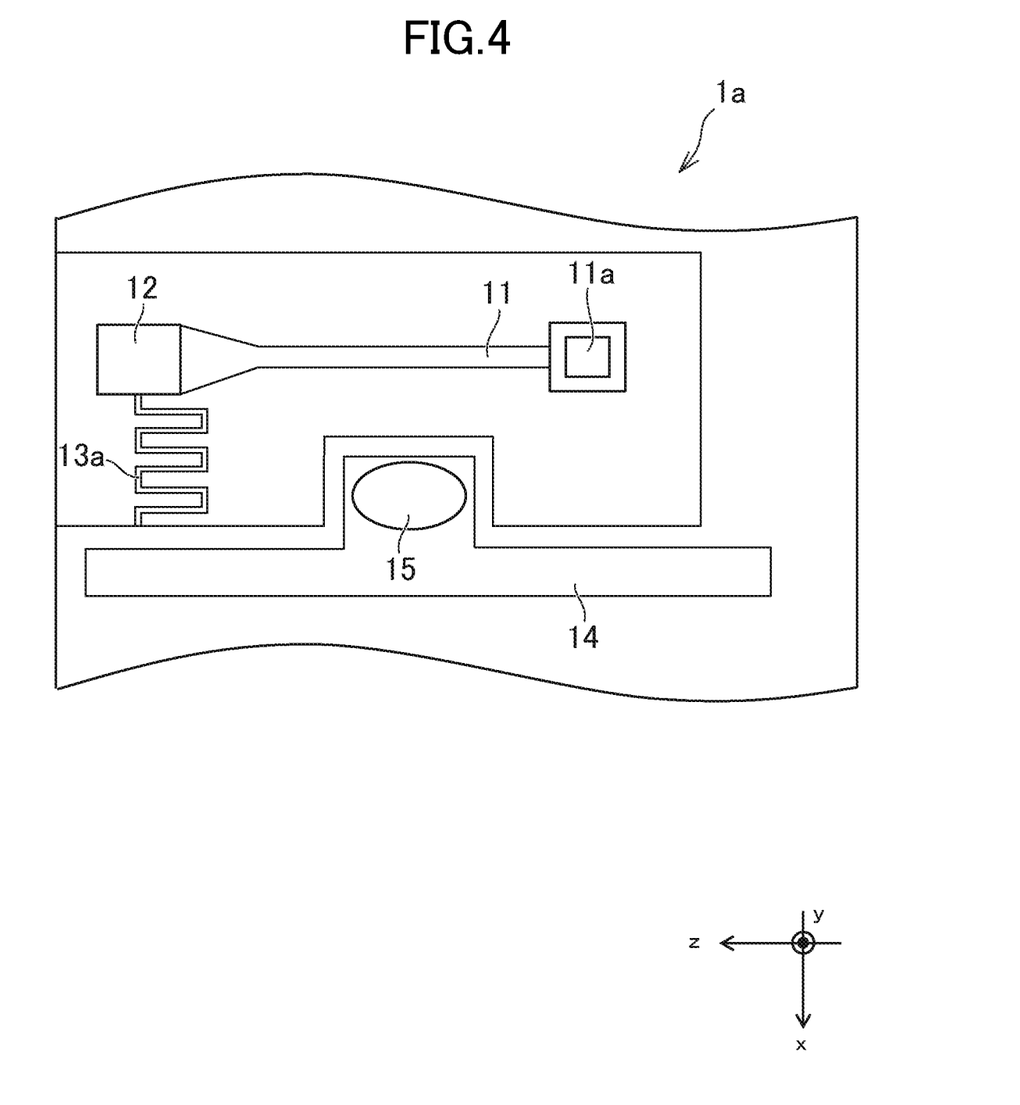
FIG. 4 is a top view showing an optical axis adjustment mechanism of an optical module according to a first modified example of the embodiment of the invention.

FIG. 4 is a top view showing an optical axis adjustment mechanism of an optical module 1a according to a first modified example of the embodiment of the invention. In the optical module 1a of the modified example, the mirror 12 is supported by a first cantilever spring 13a. Moreover, the electrode 14 and the brazing material 15 are provided only on the side where the first cantilever spring 13a is provided.

Even when the first cantilever spring 13a is included as in the modified example, the orientation of the mirror 12 can be changed by manipulating the manipulation lever 11, and the laser light can be optically coupled to the optical waveguide 30. Moreover, the manipulation lever 11 can be brazed by flowing the brazing material 15 after the optical axis adjustment step.

By providing the first cantilever spring 13a, the electrode 14, and the brazing material 15 on one side in an unbalanced manner as in the modified example, the optical axis adjustment mechanism can be further downsized compared with the first embodiment, and the entire optical module 1a can be downsized when formed into an array form. Moreover, employing the first cantilever spring 13a enables the mirror 12 to be greatly displaced with a relatively small external force.

Figure 5:
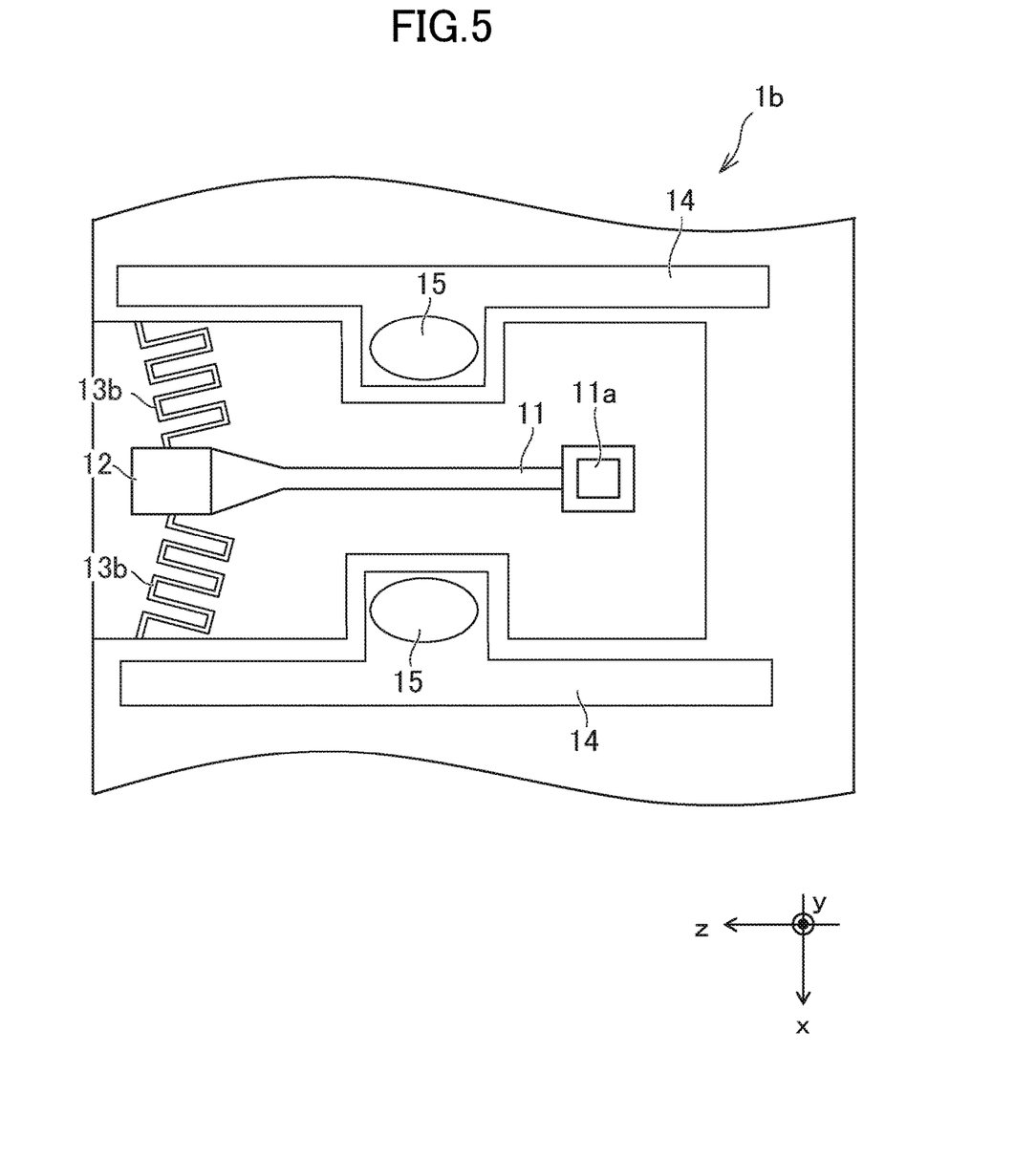
FIG. 5 is a top view showing an optical axis adjustment mechanism of an optical module according to a second modified example of the embodiment of the invention.

FIG. 5 is a top view showing an optical axis adjustment mechanism of an optical module 1b according to a second modified example of the embodiment of the invention. In the optical module 1b of the modified example, a plurality of support springs (inclined springs 13b) are provided to extend in the directions different from each other. Specifically, two inclined springs 13b are provided for the mirror 12, and inclined from the x-axis direction to the positive direction of the z-axis. Since the plurality of inclined springs 13b provided to extend in the directions different from each other are included, the direction in which the inclined spring 13b easily stretches or compresses (the extending direction of the inclined spring 13b) is not orthogonal to the x-axis, and thus it becomes easy to move the mirror 12 in the z-axis direction. Moreover, the width of the optical axis adjustment mechanism in the x-axis direction can be made narrower than that when two support springs are provided in the same direction, and thus the optical module 1b can be downsized.

Figure 6:
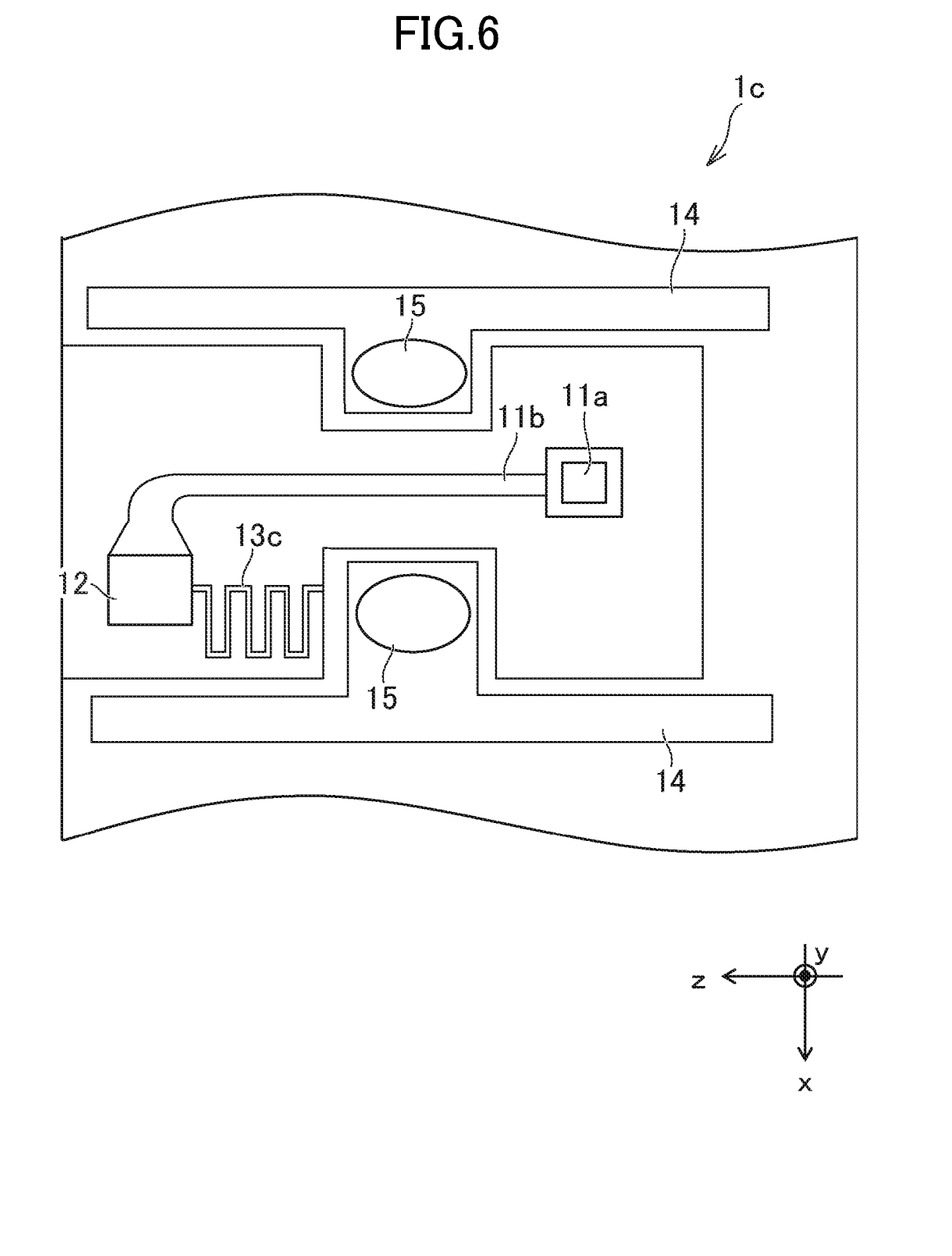
FIG. 6 is a top view showing an optical axis adjustment mechanism of an optical module according to a third modified example of the embodiment of the invention.

FIG. 6 is a top view showing an optical axis adjustment mechanism of an optical module 1c according to a third modified example of the embodiment of the invention. In the optical module 1c of the modified example, a manipulation lever (bent lever 11b) is bent to connect to the mirror 12, and extends along a support spring (second cantilever spring 13c). The bent lever 11b connects to the mirror 12 in the x-axis direction, and is bent to extend in the z-axis direction. The second cantilever spring 13c is provided between the mirror 12 and the SOI substrate 10, and extends in the z-axis direction. Even when the bent lever 11b and the second cantilever spring 13c are included as described above, the optical axis of laser light reflected by the mirror 12 can be adjusted, and the optical module 1c can be downsized.

Figure 7:
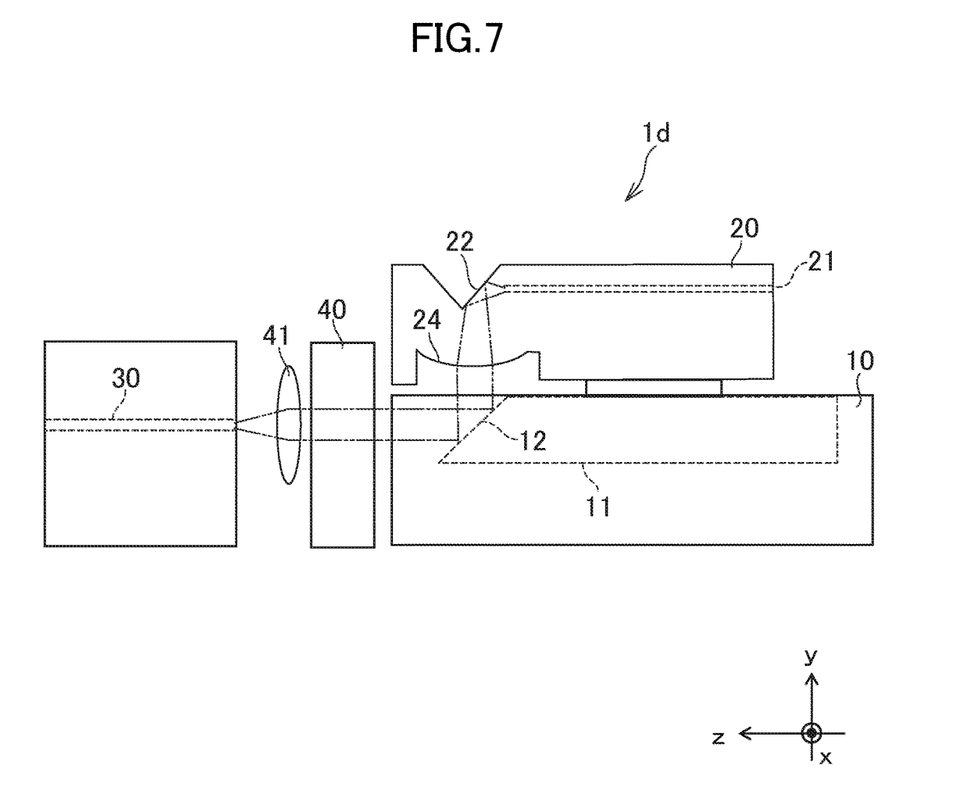
FIG. 7 is a side view showing an optical module according to a fourth modified example of the embodiment of the invention.

FIG. 7 is a side view showing an optical module 1d according to a fourth modified example of the embodiment of the invention. The optical module 1d according to the modified example further includes an optical isolator 40 between the mirror 12 and the optical waveguide 30. The optical isolator 40 transmits a light wave traveling in the positive direction of the z-axis, but blocks a light wave traveling in the negative direction of the z-axis. Therefore, the return light to the array-type semiconductor laser device 20 is suppressed.

Moreover, in the optical module 1d according to the modified example, the lens formed integrally with the array-type semiconductor laser device 20 is a collimating lens 24. The collimating lens 24 converts divergent light reflected by the mirror surface 22 to parallel light, and allows the parallel light to be incident on the mirror 12. Therefore, the parallel light is incident on the optical isolator 40.

A focusing lens 41 is provided between the optical isolator 40 and the optical waveguide 30. The focusing lens 41 focuses the parallel light transmitted through the optical isolator 40 to be optically coupled to the optical waveguide 30. In the modified example, the joint portion between the support spring 13 and the SOI substrate 10 is not located on the optical waveguide 30 side, and an empty space is provided between the mirror 12 and the optical waveguide 30. Therefore, the optical isolator 40 and the like can be disposed in this space as shown in the modified example, and a great increase in the size of the entire optical module 1d can be prevented.

Figure 8:
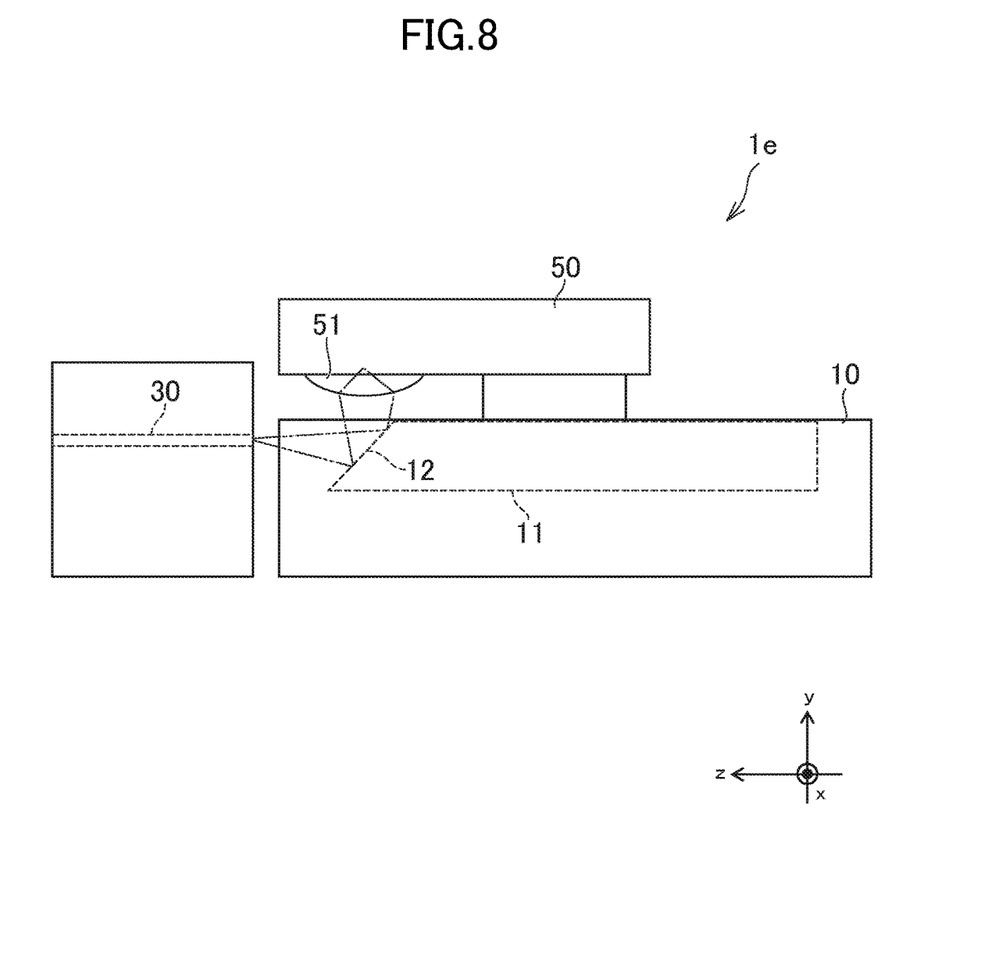
FIG. 8 is a side view showing an optical module according to another embodiment of the invention.

FIG. 8 is a side view of an optical module 1e according to another embodiment of the invention. In the optical module 1e according to the embodiment, the photonic device is an array-type semiconductor light-receiving device 50. The array-type semiconductor light-receiving device 50 is a device that receives a light wave transmitted by the optical waveguide 30 and reflected by the mirror 12 and reads the content of an optical signal. A lens 51 is formed integrally with the array-type semiconductor light-receiving device 50, and focuses and receives the divergent light reflected by the mirror 12.

In a method for manufacturing the optical module 1e according to the embodiment, in the adjustment step, the orientation of the mirror 12 is manipulated with the manipulation lever 11 to adjust the traveling direction of the light wave reflected by the mirror 12, and the light wave is adjusted so as to be optically coupled to the array-type semiconductor light-receiving device 50. As described above, even when the array-type semiconductor light-receiving device 50 or the optical waveguide 30 has an error in attachment position, the optical signal is optically coupled reliably to the array-type semiconductor light-receiving device 50, and thus the optical module 1e capable of reading the optical signal with reduced loss is obtained.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical module comprising:
   a photonic device emitting or receiving a light wave;
   an optical waveguide transmitting the light wave;
   a lens focusing the light wave;
   a mirror changing a traveling direction of the light wave to optically couple the photonic device with the optical waveguide;
   a manipulation lever manipulating an orientation of the mirror;
   a support spring supporting the mirror; and
   a substrate integrated with the mirror, the manipulation lever, and the support spring, the substrate having a surface over which the support spring is provided,
   wherein:
   the mirror includes a mirror surface reflecting the light wave, the mirror surface being directed obliquely upward so that a first optical path between the mirror surface and the optical waveguide does not overlap a second optical path between the mirror surface and the photonic device, and the second optical path extends in a direction which crosses the surface of the substrate,
   the support spring couples the mirror with the substrate so as to allow the mirror to change the orientation thereof with movement or rotation along at least two axes,
   the manipulation lever extends from the mirror in a direction in which the manipulation lever avoids approaching the optical waveguide,
   the manipulation lever has a handle,
   the mirror, the photonic device, and the handle are lined up in a row, when viewed from above the surface of the substrate,
   the mirror, the photonic device, and the handle constitute a plurality of sets of mirrors, photonic devices, and handles,
   the mirrors are arranged in a direction substantially perpendicular to the row,
   the photonic devices are arranged in the direction substantially perpendicular to the row, and
   the handles are arranged in the direction substantially perpendicular to the row.

2. The optical module according to claim 1, wherein:
   the support spring extends in a direction different from the manipulation lever.

3. The optical module according to claim 2, wherein:
   a plurality of the support springs are provided to extend in directions different from each other.

4. The optical module according to claim 1, wherein:
   the manipulation lever is bent to connect to the mirror, and extends along the support spring.

5. The optical module according to claim 1, wherein:
   the manipulation lever is brazed to the substrate.

6. The optical module according to claim 5, further comprising:
   an electrode provided adjacent to the manipulation lever on the substrate and causing a brazing material to melt.

7. The optical module according to claim 1, wherein:
   the substrate is an SOI substrate, and
   the mirror, the manipulation lever, and the support spring are integrally formed in a surface Si layer of the SOI substrate.

8. The optical module according to claim 1, wherein:
   the lens is formed integrally with the photonic device.

9. The optical module according to claim 1, wherein:
the photonic device is an array photonic device, which emits or receives each of a plurality of light waves, and
the optical waveguide transmits each of the plurality of light waves.

10. The optical module according to claim 1, further comprising:
an optical isolator between the mirror and the optical waveguide.

11. The optical module according to claim 1, wherein:
the photonic device is a semiconductor laser device.

12. The optical module according to claim 1, wherein:
the photonic device is a semiconductor light-receiving device.

13. A method for manufacturing an optical module, comprising:
a step of providing, to a substrate, a photonic device emitting or receiving a light wave, an optical waveguide transmitting the light wave, and a lens focusing the light wave;
a step of integrally forming, in the substrate,
a mirror changing a traveling direction of the light wave to optically couple the photonic device with the optical waveguide, the mirror including a mirror surface reflecting the light wave, the mirror surface being directed obliquely upward so that a first optical path between the mirror surface and the optical waveguide does not overlap a second optical path between the mirror surface and the photonic device, and the second optical path extends in a direction which crosses a surface of the substrate,
a manipulation lever manipulating an orientation of the mirror and extending from the mirror in a direction in which the manipulation lever avoids approaching the optical waveguide, and
a support spring supporting the mirror and coupling the mirror with the substrate so as to allow the mirror to change the orientation thereof with movement or rotation along at least two axes, the support spring being provided over the surface of the substrate; and
an adjustment step of manipulating the orientation of the mirror with the manipulation lever to adjust the traveling direction of the light wave reflected by the mirror,
wherein:
the manipulation lever has a handle,
the mirror, the photonic device, and the handle are lined up in a row, when viewed from above the surface of the substrate,
the mirror, the photonic device, and the handle constitute a plurality of sets of mirrors, photonic devices, and handles,
the mirrors are arranged in a direction substantially perpendicular to the row,
the photonic devices are arranged in the direction substantially perpendicular to the row, and
the handles are arranged in the direction substantially perpendicular to the row.

14. The method for manufacturing the optical module according to claim 13, further comprising:
after the adjustment step, a brazing step of flowing a brazing material between the manipulation lever and the substrate and brazing the manipulation lever to the substrate.

15. The method for manufacturing the optical module according to claim 13, wherein:
in the adjustment step, the orientation of the mirror is manipulated by applying an external force to a handle of the manipulation lever located on the side opposite to the optical waveguide with respect to a position where the mirror is disposed.

16. An optical module comprising:
a photonic device emitting or receiving a light wave;
an optical waveguide transmitting the light wave;
a lens focusing the light wave;
a mirror changing a traveling direction of the light wave to optically couple the photonic device with the optical waveguide;
a manipulation lever manipulating an orientation of the mirror;
a support spring supporting the mirror; and
a substrate integrated with the mirror, the manipulation lever, and the support spring,
wherein:
the mirror includes a mirror surface reflecting the light wave, the mirror surface being directed obliquely upward so that a first optical path between the mirror surface and the optical waveguide does not overlap a second optical path between the mirror surface and the photonic device,
the support spring couples the mirror with the substrate so as to allow the mirror to change the orientation thereof with movement or rotation along at least two axes,
the manipulation lever is fixed to the substrate and extends from the mirror in a direction in which the manipulation lever avoids approaching the optical waveguide
the manipulation lever has a handle,
the mirror, the photonic device, and the handle are lined up in a row, when viewed from above a surface of the substrate,
the mirror, the photonic device, and the handle constitute a plurality of sets of mirrors, photonic devices, and handles,
the mirrors are arranged in a direction substantially perpendicular to the row,
the photonic devices are arranged in the direction substantially perpendicular to the row, and
the handles are arranged in the direction substantially perpendicular to the row.

* * * * *